United States Patent
Yamaguchi et al.

(10) Patent No.: US 8,374,377 B2
(45) Date of Patent: Feb. 12, 2013

(54) SPEAKER APPARATUS FOR USE IN VEHICLE

(75) Inventors: Mamoru Yamaguchi, Toyokawa (JP); Koji Morita, Tajimi (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 283 days.

(21) Appl. No.: 12/764,207

(22) Filed: Apr. 21, 2010

(65) Prior Publication Data

US 2010/0272308 A1   Oct. 28, 2010

(30) Foreign Application Priority Data

Apr. 28, 2009 (JP) ................................ 2009-109802

(51) Int. Cl.
- *H04R 1/02* (2006.01)
- *H04R 1/00* (2006.01)
- *H04R 11/02* (2006.01)

(52) U.S. Cl. ......... 381/391; 381/396; 381/433; 381/386
(58) Field of Classification Search .................... 381/391
See application file for complete search history.

(56) References Cited

U.S. PATENT DOCUMENTS

| 4,728,143 A | 3/1988 | Tanino et al. | |
| 6,577,741 B1 * | 6/2003 | Basore ........................ | 381/386 |
| 8,023,680 B2 * | 9/2011 | Hayasaka et al. ............. | 381/386 |
| 8,073,184 B2 * | 12/2011 | Horigome et al. ........... | 381/386 |
| 2005/0271244 A1 * | 12/2005 | Kobayashi et al. ........... | 381/433 |
| 2007/0025584 A1 * | 2/2007 | Iwata ............................ | 381/394 |
| 2007/0098206 A1 * | 5/2007 | Ando et al. ................... | 381/391 |
| 2007/0121990 A1 * | 5/2007 | Iwata ............................ | 381/395 |

FOREIGN PATENT DOCUMENTS

| JP | 61-117750 | 7/1986 |
| JP | 2001-169374 | 6/2001 |

\* cited by examiner

*Primary Examiner* — Mohamad Musleh
*Assistant Examiner* — Ronald Hinson
(74) *Attorney, Agent, or Firm* — Greenblum & Bernstein, P.L.C.

(57) ABSTRACT

A speaker apparatus in accordance with the present invention is for use with a vehicle having a compartment and is to be mounted to the vehicle. The speaker apparatus includes: an interior member including a hole edge that defines an attachment hole; a speaker unit configured to be placed in the attachment hole, the speaker unit including a limiting member; and a speaker grille configured to be attached in the attachment hole from an inside of the compartment, the speaker grille including a claw-fixing portion that is bendable and is configured to be engaged with the hole edge. Accompanying the engagement of the claw-fixing portion with the hole edge, the speaker grille is fixed to the interior member. Accompanying the placement of the speaker unit in the attachment hole, the limiting member is positioned in a bending space for the claw-fixing portion and thereby prevents disengagement of the claw-fixing portion from the hole edge.

7 Claims, 5 Drawing Sheets

SPEAKER APPARATUS FOR USE IN VEHICLE

CROSS REFERENCE TO RELATED APPLICATION

This application claims priority from Japanese Patent Application No. 2009-109802 filed on Apr. 28, 2009. The entire content of this priority application is incorporated herein by reference.

TECHNICAL FIELD

The present invention relates to a speaker apparatus for use in a vehicle. The speaker apparatus is to be mounted to the vehicle.

BACKGROUND

In a known speaker apparatus for use with a vehicle and to be mounted to the vehicle, a claw-fixing portion has been adopted as a means for fixing a speaker grille to an interior member. The interior material has an attachment hole to which the speaker grille is attached. On the other hand, the speaker grille has a claw-fixing portion to be engaged with a hole edge of the attachment hole. Thus, accompanying engagement of the claw-fixing portion with the hole edge, the speaker grille can fixed in the attachment hole. Claw fixing is advantageous than screwing, welding, etc. when miniaturization of the apparatus is required.

However, when subjected to a force, the claw-fixing portion can deform and easily slip out of the attachment hole. In order to avoid this inconvenience, screwing or welding referred above is generally used. However, screwing needs the speaker grille to be attached from the outside of the vehicle compartment. Then, the hole edge of the attachment hole has to be exposed to the inside of the compartment, which provides a poor appearance. On the other hand, welding needs to be performed in a direction perpendicular to the plane of the interior member. Accordingly, the speaker grille cannot be welded obliquely to a plane of the interior member. Thus, fixing the speaker grille to the interior member by claw fixing regardless of the shape of the interior member is difficult.

Thus, there is a need for a speaker apparatus that can be fixed by claw fixing regardless of the shape of the interior member and can be prevented from accidental removal from the interior member.

SUMMARY

A speaker apparatus in accordance with the present invention is for use with a vehicle having a compartment and is to be mounted to the vehicle. The speaker apparatus includes: an interior member including a hole edge that defines an attachment hole; a speaker unit configured to be placed in the attachment hole, the speaker unit including a limiting member; and a speaker grille configured to be attached in the attachment hole from an inside of the compartment, the speaker grille including a claw-fixing portion that is bendable and is configured to be engaged with the hole edge. Accompanying the engagement of the claw-fixing portion with the hole edge, the speaker grille is fixed to the interior member. Accompanying the placement of the speaker unit in the attachment hole, the limiting member is positioned in a bending space for the claw-fixing portion and thereby prevents disengagement of the claw-fixing portion from the hole edge.

With such a configuration, first, the claw-fixing portion is inserted into the attachment hole from the inside of the vehicle compartment and is engaged with the hole edge of the attachment hole. The speaker grille is then fixed to the interior member. Next, accompanying the placement of the speaker unit in the attachment hole, the limiting member is positioned in the bending space for the claw-fixing portion. Then, disengagement of the claw-fixing portion from the hole edge is prevented. Thus, the speaker grille is fixed by the claw fixing while is prevented from slipping out of the attachment hole regardless of the shape of the interior member.

DETAILED DESCRIPTION

<Embodiment>

Figure 1:
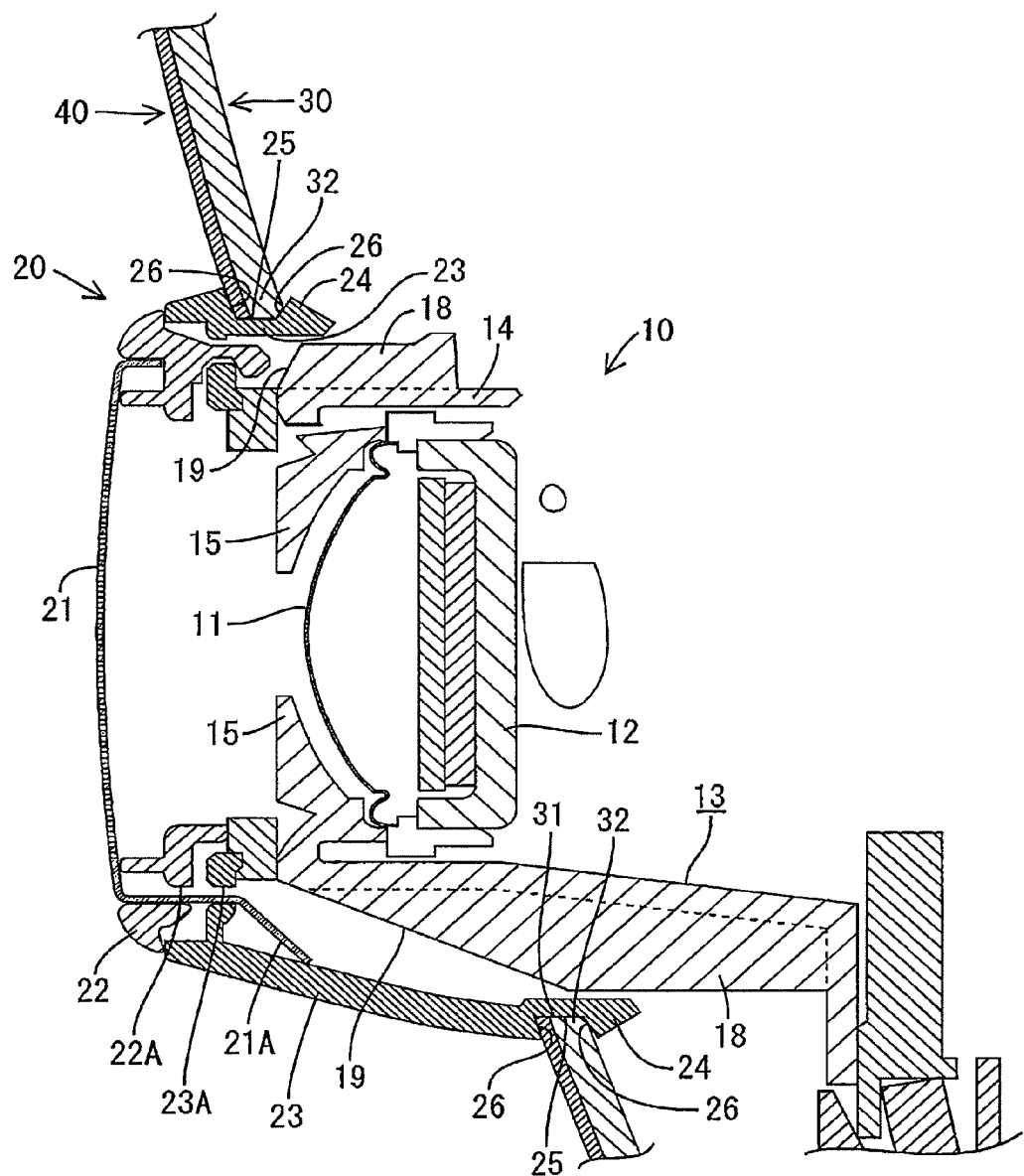
FIG. 1 is a sectional view illustrating a speaker grille in a state normally attached to a speaker unit.
Figure 2:
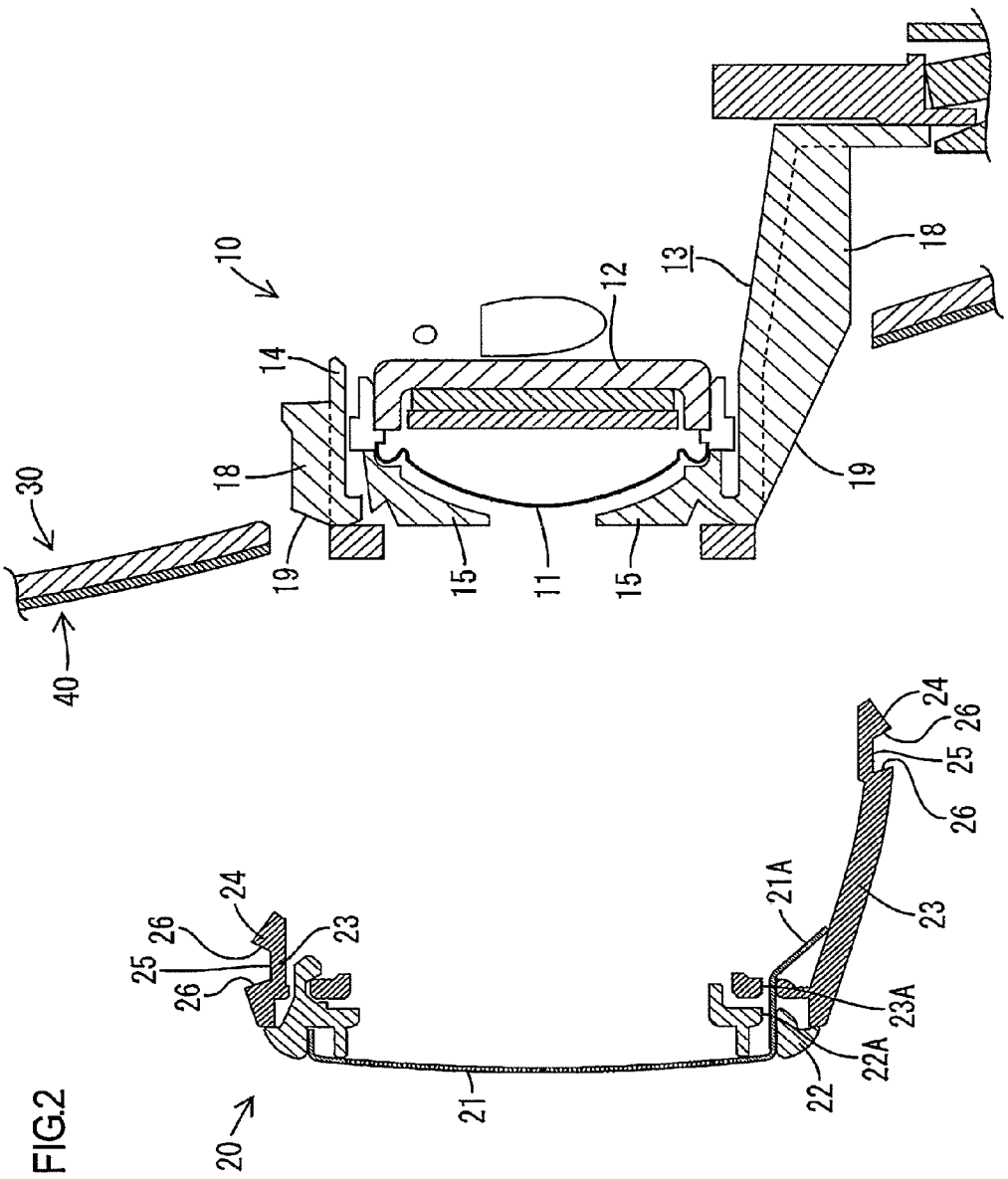
FIG. 2 is an exploded sectional view illustrating the attachment structure of the speaker apparatus of FIG. 1.

An embodiment of the present invention will be described with reference to FIGS. 1 through 5. In this embodiment, as illustrated in FIG. 1, a speaker apparatus for use in a vehicle includes a speaker unit 10, a speaker grille 20, etc. An exploded sectional view of the speaker apparatus is illustrated in FIG. 2. Both the speaker unit 10 and the speaker grille 20 are attached and are fixed to a trim board 30. The trim board 30 is an illustration of an "interior member". Note that the left side and the right side in FIGS. 1 and 2 are herein designated as the front and as the rear, respectively.

The trim board 30 is made of synthetic resin such as polypropylene, mixture of wood-based material and synthetic resin, etc. A skin 40 is adhered to a part or the entire of an inner face of the trim board 30. Furthermore, the trim board 30 has a speaker attachment hole 31 formed through the thickness thereof.

The speaker attachment hole 31 is formed in an overhanging face of the trim board 30. On the other hand, both the central axis of the speaker unit 10 and the central axis of speaker grille 20 are horizontally oriented. Thus, the protruding length of the top of the speaker grille 20 protrudes from the trim board 30 less than than the protruding length of the bottom.

The speaker unit 10 includes a speaker body 12 and a bracket 13. The speaker body 12 has a speaker 11. The bracket 13 supports the speaker body 12 so that the speaker body 12 is attached and fixed to a back face (a face opposed to the vehicle body) of the trim board 30 via the bracket 13. The speaker 11 has a generally known structure such as a diaphragm. In this embodiment, the speaker 11 is a tweeter that can reproduce mainly high frequencies. The speaker body 12 has a metal frame that supports the outer peripheral edge of the speaker 11.

Figure 5:
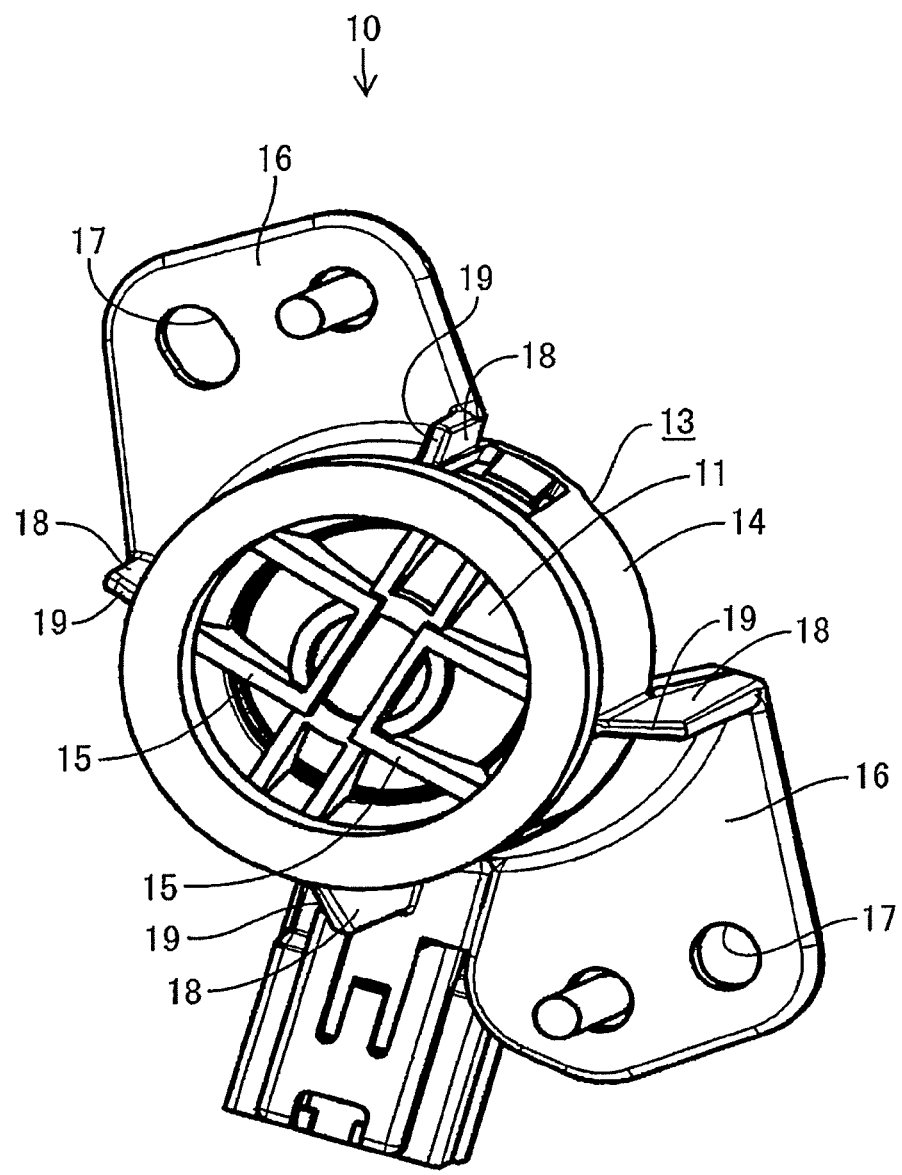
FIG. 5 is a front perspective view of the speaker unit.

As illustrated in FIG. 5, the bracket 13 has a cylindrical portion 14. The cylindrical portion 14 is cylindrical and has a hollow throughout its back-and-forth length. The cylindrical portion 14 surrounds the speaker 11.

The bracket 13 further has a protection frame 15 on a front end of the cylindrical portion 14. The protection frame 15 covers the front of the speaker 11 so as to protect the speaker 11 from possible damage from the front. When attaching the speaker unit 10, the operator can firmly hold the bracket 13 to support the speaker unit 10. Because the protection frame 15 covers the speaker 11 and protects the speaker 11 from possible damage, the operator can handle the speaker unit 10 easily and without directly contacting the speaker 11.

The bracket 13 further has two attachment plates 16 on the rear end of the cylindrical portion 14. The attachment plates 16 extend in opposite directions with respect to the cylindrical portion 14. Each attachment plate 16 has an attachment hole 17 formed through the thickness thereof. Screws (not illustrated) are inserted in the attachment holes 17 and then are screwed up into the trim board 30. The speaker unit 10 is thus fixed to the trim board 30.

Figure 3:
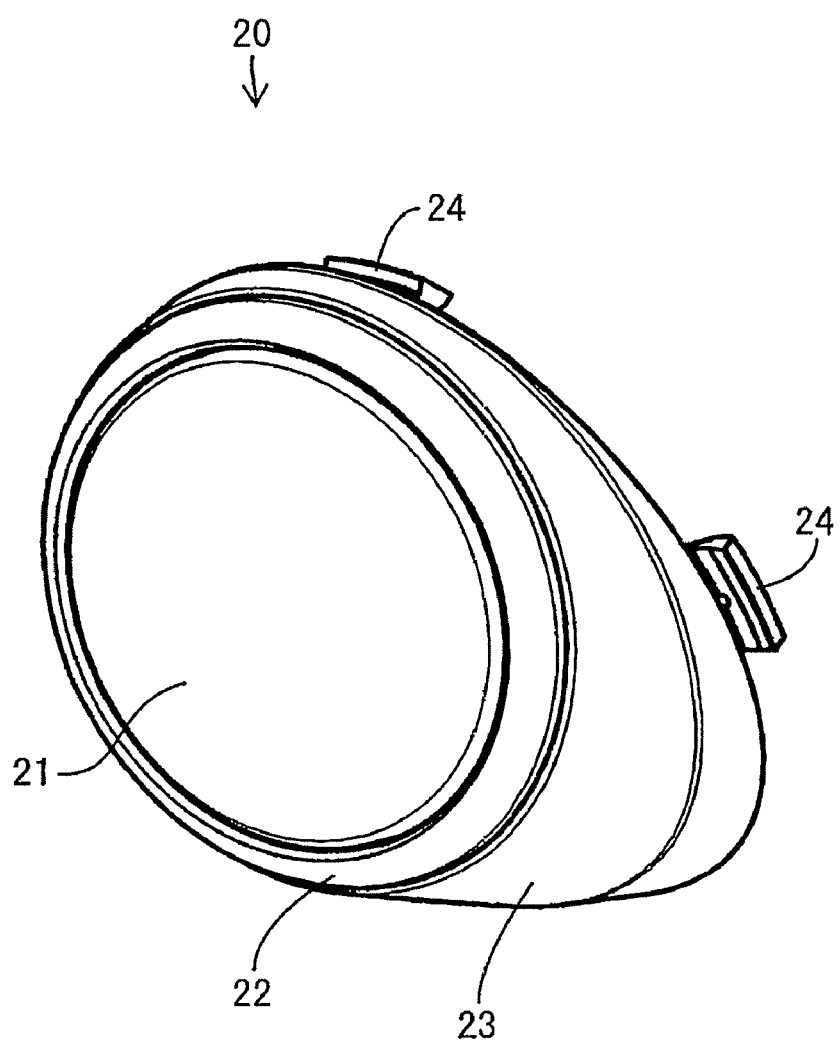
FIG. 3 is a front perspective view of the speaker grille.
Figure 4:
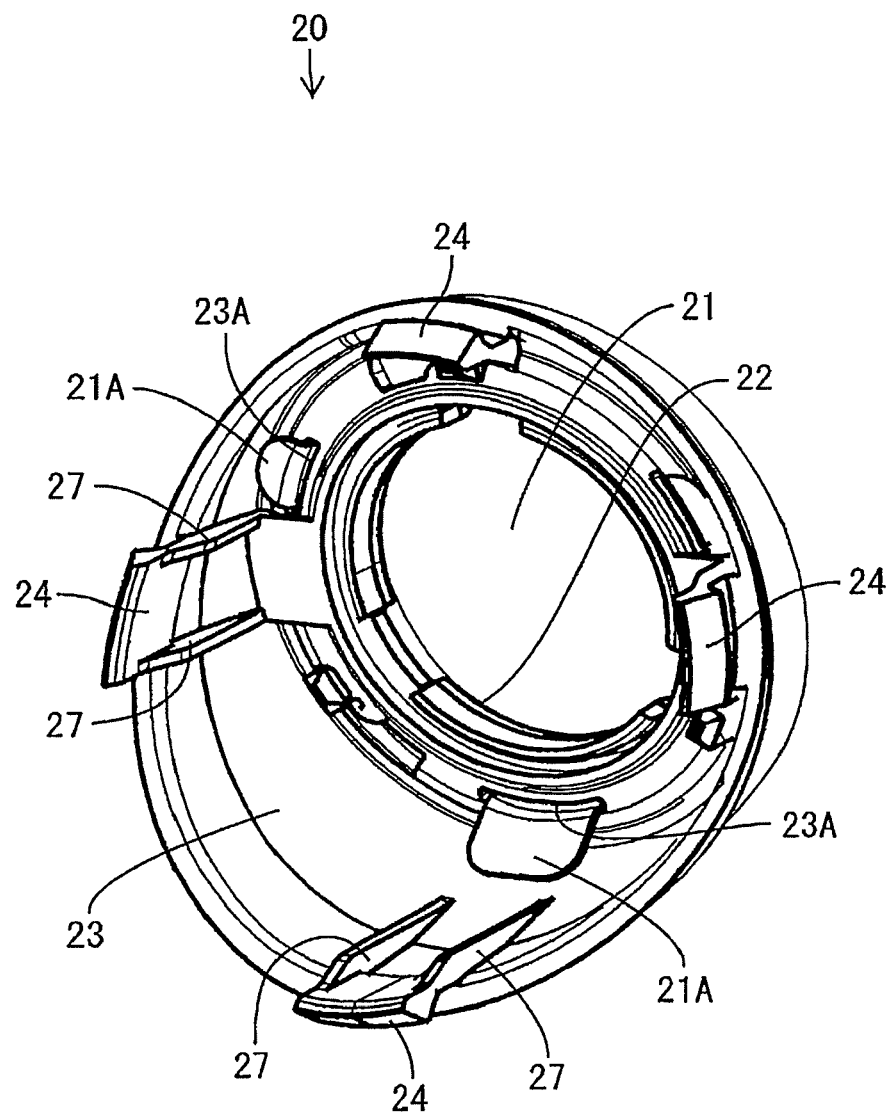
FIG. 4 is a rear perspective view of the speaker grille.

As illustrated in FIGS. 2 and 3, the speaker grille 20 has a mesh 21, a front opening member 22, and a base 23. The front opening member 22 has a substantially circular opening. The mesh 21 is stretched over the opening of the front opening member 22. The base 23 supports the front opening member 22. As illustrated in FIG. 4, the base 23 has a hollow throughout the back-and-forth length thereof. A front-end opening of the base 23 is substantially circular and is disposed coaxially with a front end of the opening of the front opening member 22. A rear-end opening is substantially oval and is disposed obliquely to an axis of the front opening member 22.

As illustrated in FIG. 4, the mesh 21 has a plurality of flaps 21A. The flaps 21A are inserted in respective first slits 22A of the front opening member 22 and in respective second slits 23A of the front end of the base 23, and further extend rearward. The mesh 21 is thus fixed to the speaker grille 20 to cover the opening of the front opening member 22.

As illustrated in FIG. 4, the base 23 of the speaker grille 20 has a plurality of claw-fixing portions 24. The claw-fixing portions 24 extend rearward from the rear end of the base 23. The claw-fixing portions 24 are circumferentially spaced from each other around the rear end of the base 23. The claw-fixing portions 29 protrude beyond the rear end of the base 23. The claw-fixing portions 24 can bend radially inward (i.e. toward the axis of the front opening member 22).

As illustrated in FIG. 1, each claw-fixing portion 24 has a recess 25. The recess 25A is fitted on a hole edge 32 of the speaker attachment hole 31. The recess 25 has two walls opposed to each other with respect to the back-and-forth direction of the front opening member 22. These walls configure engagement faces 26. The engagement faces 26 are engaged with the hole edge 32 of the speaker attachment hole 31. The plane of each engagement face 26 crosses the back-and-forth direction. Accompanying engagement of the engagement faces 26 with the hole edge 32 of the speaker attachment hole 31, the speaker grille 20 is fixed to the trim board 30. In addition, the claw-fixing portions 24 have support ribs 27. As illustrated in FIG. 4, the support ribs 27 are disposed radially inside the claw fixing portions 24. The support ribs 27 support the claw-fixing portions 24 against being broken.

Referring to FIG. 5 again, the bracket 13 has a plurality of limiting pieces 18 (each is an illustration of a "limiting member"). The limiting pieces 18 are elongated in the back-and-forth direction and thin. The limiting pieces 18 are disposed in an area surrounding an outer peripheral face of the speaker 11. Specifically, in this embodiment, the limiting pieces 18 are circumferentially spaced from each other on an outer peripheral face of the cylindrical portion 14. When the speaker unit 10 is in a state normally placed in the speaker attachment hole 31 as illustrated in FIG. 1, the limiting pieces 18 are positioned radially inside the respective claw-fixing portions 24. That is, the speaker unit 10 and the speaker grille 20 define a bending space that allows the claw-fixing portions 24 to bend, and the limiting pieces 18 are positioned in the bending space.

A clearance is provided between each claw-fixing portion and the respective limiting piece 18. The clearance is set such that the engagement faces 26 of the recess 25 are securely held in engagement with the hole edge 32 of the speaker attachment hole 31 even in the event when the claw-fixing portion 24 bends radially inward by the dimension for the clearance. Therefore, even when the speaker grille 20 is subjected to force, the claw-fixing portion 24 contacts the limiting piece 18 so that further bending deformation of the claw-fixing portion 24 is stopped. Thus, the claw-fixing portion 24 is safe from being removed from the engagement with the hole edge 32 of the speaker attachment hole 31.

In addition, each limiting piece 18 has a guide end 19. The limiting piece 18 has a contact portion for the claw-fixing portion 24 to contact. The guide end 19 is disposed in front of the contact portion. The guide end 19 extends radially inward and frontward. Thus, when the speaker unit 10 is being attached in the speaker attachment hole 31, the guide end 19 guides the speaker unit 10 to the normal attachment position so that the attachment operation is easy. Furthermore, because the clearances are provided between the claw-fixing portions 24 and the respective limiting pieces 18, the speaker unit 10 can be smoothly inserted to the inside of the base 23 of the speaker grille 20.

This embodiment is configured as above. The operation of the present embodiment will hereinafter be described. First, the speaker grille 20 is attached to the trim board 30 from the inside of the compartment. More specifically, the claw-fixing portions 24 slidingly contact the hole edge 32 of the speaker attachment hole 31 while bending radially inward. Then, when a distal end portion of the claw-fixing portions 24 have passed the hole edge 32, the claw-fitting portions 24 elastically return, and the recesses 25 is fitted on the hole edge 32. The hole edge 32 is thus engaged with the front and rear engagement faces 26 of the recesses 25 in the back-and-forth direction, and the speaker grille 20 is fixed to the trim board 30. Next, the speaker unit 10 is fixed to the speaker attachment hole 31 of the trim board 30 from the outside of the compartment.

Note here that, in this embodiment, accompanying attachment of the speaker unit 10 to the trim board 30 whereto the speaker grille 20 has been attached, the speaker unit 10 is placed in the base 23 of the speaker grille 20, and the limiting pieces 18 are positioned radially inside the respective claw-fixing portions 24. Therefore, further radially inward bending of the claw-fixing portions 24 is stopped, and the engagement faces 26 of the claw-fixing portions 24 are held in engagement with the hole edge 32 of the speaker attachment hole 31.

As described above, in this embodiment, the limiting pieces 18 are positioned radially inside the claw-fixing portions 24. Therefore, the claw-fixing portions 24 contacts the limiting pieces 18 so that the engagement faces 26 of the claw-fixing portions 24 are held in engagement with the hole edge 32 of the speaker attachment hole 31. This makes it possible to prevent accidental removal of the speaker grille 20 even when the speaker grille 20 is subjected to force. Thus, even in the case where the speaker attachment hole 31 of the trim board 30 is arranged in the inclined face, accidental removal of the speaker grille 20 can be prevented.

Furthermore, because the speaker unit 10 includes the speaker body 12 and the bracket 13, the operator can firmly hold the bracket 13 to handle the speaker unit 10. This makes it easy to handle the speaker unit 10. Furthermore, because the operator does not have to directly contact the speaker 11, the speaker 11 can be protected from possible damage. Moreover, because the bracket 13 includes the limiting pieces 18 arranged around the cylindrical portion 14, additional limiting pieces 18 can be provided by minor design change.

<Other Embodiments>

The present invention is not limited to the embodiment described above with reference to the drawings. For example, following embodiments are also included within the scope of the present invention.

(1) In the above-described embodiment, the speaker grille 20 is attached to the trim board 30. In accordance with the present invention, the speaker grille 20 may be attached to other places such as a top face of an instrument panel, a pillar garnish, a quarter trim, a deck side trim. Furthermore, in the above-described embodiment, the speaker unit 10 is fixed to the trim board 30. In accordance with the present invention, the speaker unit 10 may be fixed directly to the vehicle body panel.

(2) In the above-described embodiment, the wide and thin limiting pieces 18 are illustrated as the limiting member. In accordance with the present invention, the limiting member does not have to be wide and thin. The limiting member may be column-shaped protrusions.

(3) In the above-described embodiment, the tweeter is illustrated as the speaker 11. In accordance with the present invention, the type of the speaker is not limited to the tweeter. For example, the speaker may be a full-range speaker.

(4) In the above-described embodiment, the limiting pieces 18 are arranged on the bracket 13. In accordance with the present invention, the limiting member may be arranged on the speaker body 12.

What is claimed is:

1. A speaker apparatus for use in a vehicle having a compartment and to be mounted to the vehicle, the speaker apparatus comprising:
    an interior member including a hole edge that defines an attachment hole;
    a speaker unit configured to be placed in the attachment hole, the speaker unit including a limiting member; and
    a speaker grille configured to be attached in the attachment hole from an inside of the compartment, the speaker grille including a claw-fixing portion that is bendable and is configured to be engaged with the hole edge, wherein
    when the speaker grille is fixed to the interior member, the claw-fixing portion is engaged with the hole edge of the interior member, and
    when the speaker unit is placed in the attachment hole, the limiting member is disposed in the attachment hole radially inward of the claw-fixing portion in a bending space for the claw-fixing portion thereby preventing disengagement of the claw-fixing portion from the hole edge.

2. The speaker apparatus according to claim 1, wherein the speaker unit includes a speaker body and a bracket that supports the speaker body, the speaker body having a speaker having an outer peripheral face, wherein
    the limiting member includes a plurality of limiting members, and wherein
    the plurality of limiting members are disposed in an area surrounding the outer peripheral face of the speaker.

3. The speaker apparatus according to claim 1, wherein the claw-fixing portion includes a recess having engagement faces, the recess and the engagement faces being engagable with the hole edge of the interior member and provided on an outward facing radial surface of the speaker grille.

4. The speaker apparatus according to claim 1, wherein when the speaker unit is placed in the attachment hole and the speaker grille is attached to the attachment hole, a clearance is provided between the claw-fixing portion and the limiting member to limit inward bending deformation of the claw-fixing portion and to prevent disengagement of the claw-fixing portion from the attachment hole.

5. The speaker apparatus according to claim 1, wherein the limiting member include a contact portion extending radially outward for contacting the claw-fixing portion and a guide end disposed at a front side of the limiting member and extending radially inward.

6. The speaker apparatus according to claim 1, wherein a support rib is disposed in the attachment hole and extends radially inward from the claw-fixing portion for supporting the claw-fixing portion.

7. The speaker apparatus according to claim 1, wherein the interior member has an overhang portion, the attachment hole is formed in the overhang portion, the speaker grill has an upper protruding portion and a lower protruding portion protruding from the interior member, and the upper protruding portion protrudes from the interior member for a length shorter than the lower protruding portion.

* * * * *